US012436503B2

(12) United States Patent
Mahadev et al.

(10) Patent No.: US 12,436,503 B2
(45) Date of Patent: Oct. 7, 2025

(54) SINGLE USE DISPOSABLE ELAPSED TIME INDICATOR WITH ABSORBABLE MATERIAL

(71) Applicant: CAREFUSION 303, INC., San Diego, CA (US)

(72) Inventors: Shwetha Mahadev, Bangalore (IN); Shraya Sajjanar, Dharwad (IN); Abin Austin, Thrissur (IN)

(73) Assignee: CAREFUSION 303, INC., San Diego, CA (US)

( * ) Notice: Subject to any disclaimer, the term of this patent is extended or adjusted under 35 U.S.C. 154(b) by 447 days.

(21) Appl. No.: 17/945,757

(22) Filed: Sep. 15, 2022

(65) Prior Publication Data

US 2024/0094679 A1 Mar. 21, 2024

(51) Int. Cl.
*G04F 1/02* (2006.01)
*G04F 1/00* (2006.01)

(52) U.S. Cl.
CPC . *G04F 1/02* (2013.01); *G04F 1/00* (2013.01)

(58) Field of Classification Search
CPC ... G04F 1/02; G04F 1/00; G04F 13/06; A61B 90/08; A61B 2090/0807
See application file for complete search history.

(56) References Cited

U.S. PATENT DOCUMENTS 3,954,011 A 5/1976 Manske
4,229,813 A * 10/1980 Lilly ........................ G04F 13/06 968/856
5,528,563 A * 6/1996 Tothill ..................... G07C 1/30 368/327
5,602,804 A 2/1997 Haas
7,232,253 B2 * 6/2007 Isbitsky .................... G04F 1/06 374/102
7,817,498 B1 * 10/2010 Hinckley .................. G04F 1/06 368/327
8,137,303 B2 3/2012 Stout et al.
(Continued)

FOREIGN PATENT DOCUMENTS

EP 2021755 B1 2/2013
EP 2968890 1/2016

OTHER PUBLICATIONS

International Search Report and Written Opinion for Application No. PCT/US2023/032548, dated Dec. 8, 2023, 15 pages.
(Continued)

*Primary Examiner* — Edwin A. Leon
*Assistant Examiner* — Sean R Brannon
(74) *Attorney, Agent, or Firm* — MASCHOFF BRENNAN

(57) ABSTRACT

A single use disposable elapsed time indicator and methods for using same include an indicator that can have a flexible chamber for holding an aqueous medium and a slot with a viewing window and a longitudinal axis. The slot is connected to the chamber via a passage having a breakable seal therein. An absorbable material is located within and at a first end of the slot that swells upon exposure to the aqueous medium. A graded scale is also included along the longitudinal axis of the slot to indicate periods of elapsed time. The absorbable material is configured to expand from the first end of the slot toward an opposing end of the slot along the longitudinal axis and thereby mark elapsed time on the graded scale.

20 Claims, 3 Drawing Sheets

(56) References Cited

U.S. PATENT DOCUMENTS

| | | | | |
|---|---|---|---|---|
| 8,388,131 | B2 | 3/2013 | Heacock et al. | |
| 9,746,421 | B2 * | 8/2017 | Heacock | G01N 31/229 |
| 2003/0214997 | A1 * | 11/2003 | Diekmann | G04F 1/00<br>374/102 |
| 2004/0013048 | A1 * | 1/2004 | Adamy | G04F 1/06<br>368/327 |
| 2007/0036038 | A1 | 2/2007 | Ambrozy et al. | |
| 2007/0058490 | A1 | 3/2007 | Stange et al. | |
| 2007/0293818 | A1 * | 12/2007 | Stout | G09F 3/0291<br>604/93.01 |
| 2009/0010803 | A1 * | 1/2009 | Ambrozy | G01K 5/00<br>374/E11.006 |
| 2012/0027647 | A1 | 2/2012 | Ambrozy et al. | |

OTHER PUBLICATIONS

Written Opinion from the International Preliminary Examining Authority for Application No. PCT/US2023/032548, dated Feb. 29, 2024, 5 pages.

International Preliminary Report on Patentability from the International Preliminary Examining Authority for Application No. PCT/US2023/032548, dated Nov. 19, 2024, 14 pages.

* cited by examiner

SINGLE USE DISPOSABLE ELAPSED TIME INDICATOR WITH ABSORBABLE MATERIAL

TECHNICAL FIELD

The present disclosure generally relates to single use disposable elapsed time indicators and more particularly to an elapsed time indicating device that can be used with medical devices that operates based on swelling of an absorbable material within the indicator.

BACKGROUND

Many medical devices have a limited shelf-life and are designed for use over a limited period of time once the device is placed in service. Such products are usually associated with a single event, a restricted time period or restricted access. For example, nearly all modern medical device disposables such as syringes, needless access connectors, needle-free connectors (NFCs), catheters, have a desired time limit for use once the device is placed in service or activated.

In some instances, a healthcare professional charts or notates a start time when a device is placed in service. However, this is not always the case. And often times, the length of time that a device is placed in service is not known.

Disposable time indicating devices are also known. See U.S. Pat. Nos. 3,954,011 and 5,602,804 and 8,388,131.

However, a continuing need exists for disposable elapsed time indicators that can be used in medical environment and particularly elapsed indicating devices that can show the time period that has elapsed and time period remaining so as to provide the healthcare professional sufficient time to make preparations regarding the particular device being monitored.

SUMMARY OF THE DISCLOSURE

Aspects of the subject technology relate to a single use disposable elapsed time indicator that includes an absorbable material configured to swell upon exposure to an aqueous medium along a graded scale to indicate periods of elapsed time. Such an indicator can comprise a flexible chamber for holding an aqueous medium; a slot having a first end and second end opposing the first end and with a viewing window and a longitudinal axis, wherein the first end of the slot is connected to the chamber via a passage having a breakable seal therein; an absorbable material located within and at the first end of the slot that swells exposure to the aqueous medium; and a graded scale along the longitudinal axis of the slot to indicate periods of elapsed time. Advantageously, the absorbable material is configured to expand from the first end of the slot toward the second end of the slot along the longitudinal axis of the slot and thereby mark elapsed time on the graded scale. The graded scale can denote elapsed time periods of hours or days.

Additional aspects of the subject technology include methods of using single use disposable elapsed time indicator. Such methods can comprise an indicator that includes an absorbable material configured to swell upon exposure to an aqueous medium along a graded scale to indicate periods of elapsed time and includes activating the indicator by contacting the absorbable material with the aqueous medium. Additional methods include activating a device by depressing a flexible chamber holding the aqueous medium to force the aqueous medium from the flexible chamber to a slot containing the absorbable material and rupturing a breakable seal between the flexible chamber and the slot.

Embodiments of the foregoing include one or more of the following features individually or combined. For example, wherein the absorbable material comprises a polyacrylic acid or copolymer thereof, a polyacrylate or copolymer thereof, a polyacrylamide or copolymer thereof and/or wherein the aqueous medium is deionized or distilled water.

Additional advantages of the subject technology will become readily apparent to those skilled in this art from the following detailed description, wherein only certain aspects of the subject technology are shown and described, simply by way of illustration. As will be realized, the subject technology is capable of other and different configurations, and its several details are capable of modifications in various other respects, all without departing from the subject technology. Accordingly, the drawings and description are to be regarded as illustrative in nature, and not as restrictive.

BRIEF DESCRIPTION OF THE DRAWINGS

The accompanying drawing, which is included to provide further understanding and is incorporated in and constitute a part of this specification, illustrate disclosed embodiments and together with the description serve to explain the principles of the disclosed embodiments. In the drawings.

DETAILED DESCRIPTION OF THE DISCLOSURE

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 2B:
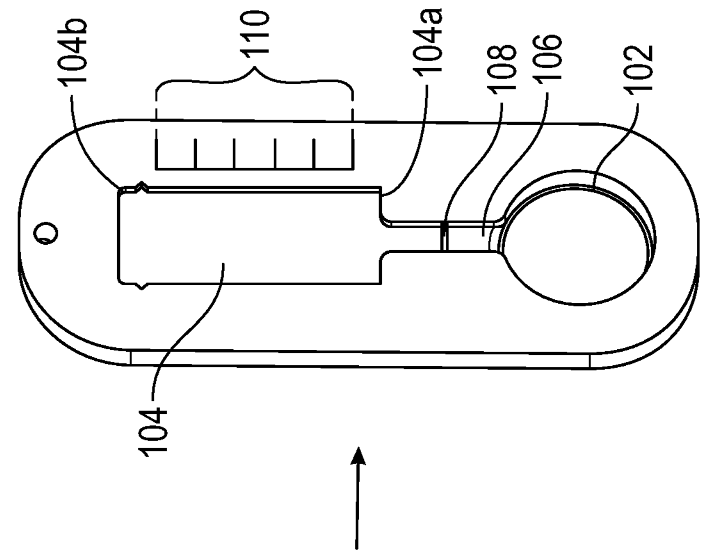
FIGS. 2A and 2B depict an exploded view of the single use disposable elapsed time indicating device of FIG. 1.
Figure 2A:
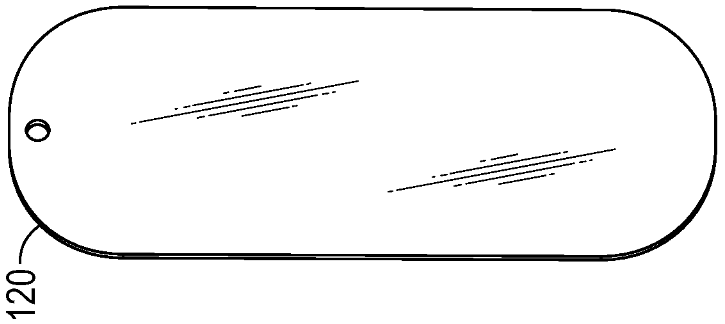
Figure 1:
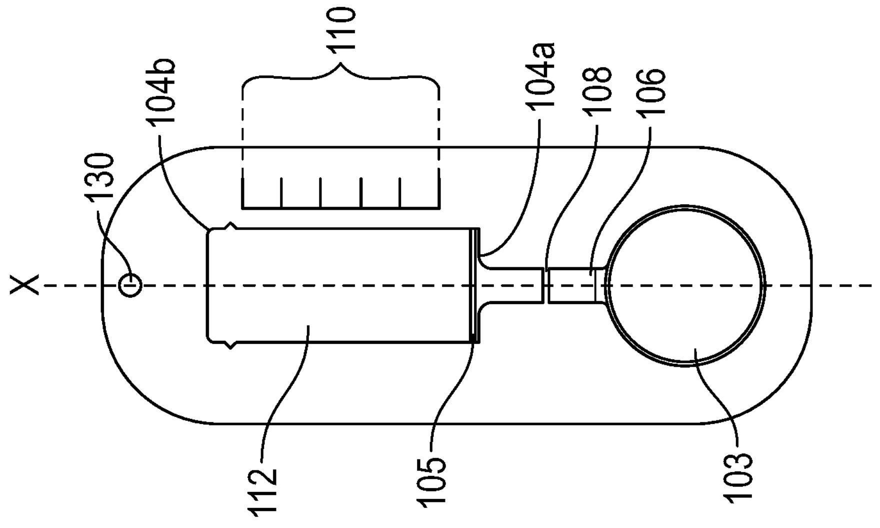
FIG. 1 depicts a single use disposable elapsed time indicating device according to aspects of the present disclosure.

Referring now in more detail to the drawings in which like reference numerals refer to like or corresponding elements among the several views, there is shown in FIG. 1 and FIGS. 2A-2B a single use disposable elapsed time indicator according to aspects of the present disclosure (100). As illustrated, the indicator includes a flexible chamber 102 for holding an aqueous medium 103 and a slot 104 having a first end 104*a* and second end 104*b* opposing the first end with a longitudinal axis (X). The first end 104*a* of the slot 104 is connected to the chamber 102 via a passage 106 having a breakable seal 108 therein. In an aspect of the present disclosure, the slot has a volume that is less than the volume of the aqueous medium in the chamber. And consequently, the chamber has a volume that is greater than the volume of the slot.

The indicator further includes an absorbable material 105 located within the slot 104 and at the first end 104*a* of the slot 104. The absorbable material 105 swells when exposed to the aqueous medium 103. The breakable seal 108 within passage 106 separates and prevents the aqueous medium 103 from contacting the absorbable material 105 within the slot 104 until it is ruptured. The breakable seal is configured to rupture upon pressure from the aqueous medium being forced into the slot via the passage such as by depressing the flexible chamber holding the aqueous medium. The slot can also include a viewing window 112 along the longitudinal axis (X) for viewing the absorbable material.

A graded scale 110 is located along the longitudinal axis (X) of the slot (104) to indicate periods of elapsed time. The graded scale has markings to denote elapsed time periods such as markings for elapsed periods of hours or days, for example. The marking can be in the form of ticks or lines together with numbers, words, symbols and disposed on a surface of the chamber along a viewing window 112. Thus, the associated elapsed time period can be indicated by markings, such as ticks with word descriptions of the time period (e.g., hour 1, hour 2, etc., day 1, day 2, day 3, day 4, etc.) or simply numbers by themselves (e.g., 1, 2, 3, 4, etc.).

Indicator devices according to aspects of the present disclosure can also include a fastener to secure the indicator to a medical device. For example, the indicator can also include a hole 130 through which a line or string can be passed and used to fasten the indicator to a particular medical device to track elapsed time. Alternatively, or in combination with a string or line, indicator devices according to aspects of the present disclosure can also include an adhesive, such as a peel-off sticker, on a surface of the indicator to adhere the indicator to a medical device.

FIGS. 2A-2B show an exploded view of the indicator of FIG. 1. As shown in FIG. 2, a transparent cover 120 (part A) can be adhered to an injected molded counterpart (B) which includes the flexible chamber 102, slot 104, passage 106, breakable seal 108, and graded scale 110. The breakable seal can be a thin plastic plate-like element within the passage which form a breakable seal upon attachment of the cover. Prior to adhering cover 112, the absorbable material 105 can be seated in the first end of the slot of counter part B and aqueous medium 103 can be added to the chamber of counter part B. Once the transparent cover 120 is attached to its counterpart B, the cover creates a viewing window 112 for viewing swelling of the absorbable material along the longitudinal axis of the slot. Alternatively, the counterpart B can be transparent and cover A opaque or even bother parts can be transparent, although such an arrangement tends to have lower contrast against the absorbable material.

The flexible chamber, slot, passage, and breakable seal can be individually composed of one or more of a plastic, polycarbonate, polyacrylate, polyester, polyolefin such as polypropylene, acrylonitrile-butadiene-styrene, etc. In an embodiment of the present disclosure, the flexible chamber, slot, passage, and breakable seal are composed of the same material and formed by injection molding. A cover can then be attached to the injected molded piece, e.g., to cover the flexible chamber, slot, passage, and breakable seal, which can be composed of a paper board, aluminum foil, transparent plastic. Such materials are useful for fabricating medical devices and can tolerate sterilization. Advantageously, single use disposable elapsed time indicators according to aspects of the present disclosure can be sterilized. That is, the indicators can be subjected to radiation or heat sufficient to sterilize the device.

As shown by the exemplary figures, flexible chamber 102 is in the form of a bulb than can be depressed to force the aqueous medium from the chamber into the passage and rupture the breakable seal 108 and further to contact the absorbable material 105. A check valve, not shown, can also be included in the passage to prevent to reduce flow of the aqueous medium to the flexible chamber. As further shown in the exemplary figures, the slot in in the form of a rectangular cavity having a viewing window. In an aspect of the present disclosure, the volume of the slot (e.g., 2 ml) is less than the volume of the chamber (e.g., 5 ml) filled with the aqueous medium, e.g., water such as deionized or distilled water.

The absorbable material is configured to expand from the first end of the slot toward the second end of the slot along the longitudinal axis of the slot and thereby mark elapsed time on the graded scale. For example, as the aqueous medium contacts the absorbable material swells at a predetermined rate which is used to graduate the scale in hours and/or days. Thus, the various makings of the graded scale can be used to track elapsed time as the absorbable material swells to aligns with, approaches or crosses the markings. The various makings of the graded scale can also be used to estimate the remaining time before a given device expires.

In aspects of the disclosure, sample calculations can be used to estimate swelling rate of an absorbent polymer such as a hydrogel. For example, swelling rate is given by Voigt model equation: $S_t=S_e\ (1-e^{-t/r})$. In such an equation, t is the swelling time, $S_t$ is the swelling capacity at time t, $S_e$ is the equilibrium swelling, i.e., the swelling capacity at infinite time or the maximum water-holding capacity, r is called the rate parameter, which is the time required to reach 0.63 of the equilibrium. Based on such calculations, swell rate and thus elapsed time of a given absorbable material can be estimated.

Absorbable materials that can be used with indicator devices according to aspects of the present disclosure include, for example, a polyacrylic acid or copolymer thereof, a polyacrylate (such as sodium polyacrylate) or copolymer thereof, a polyacrylamide or copolymer thereof. Superabsorbent polymers, e.g., sodium polyacrylate and copolymers thereof, can absorb and retain a large amount of liquid proportionate to their mass. Such absorbent polymers can expand up to 400 times their original size and are used in used in wound dressings and surgical pads to absorb blood, food packaging to absorb excess moisture and are sterilization compatible.

To enhance contrast of the absorbable material to the indicator device, the absorbable material and/or aqueous medium can include a dye to color the absorbable material. Such dyes having a color include dyes having a dark red, blue, green color, or any color to enhance contrast of the absorbable material. Such a dye can aid in viewing the location of the absorbable material along the longitudinal axis of the slot as it swells.

The aqueous medium can be simply water such as distilled, deionized or tap water. In addition, the aqueous medium can include one or more alcohols such as isopropanol and/or ethanol in addition to water. The amount that the absorbable material swells is partly a function of the length of time the material remains in contact with the aqueous medium and the type of aqueous medium. It was observed for sodium polyacrylate, the difference in the ionic concentration of tap water versus distilled water resulted in the material in distilled water absorbed as much as 10 times more water than the same material in tap water.

Figures 3A, 3B, 3C, 3D, 3E:
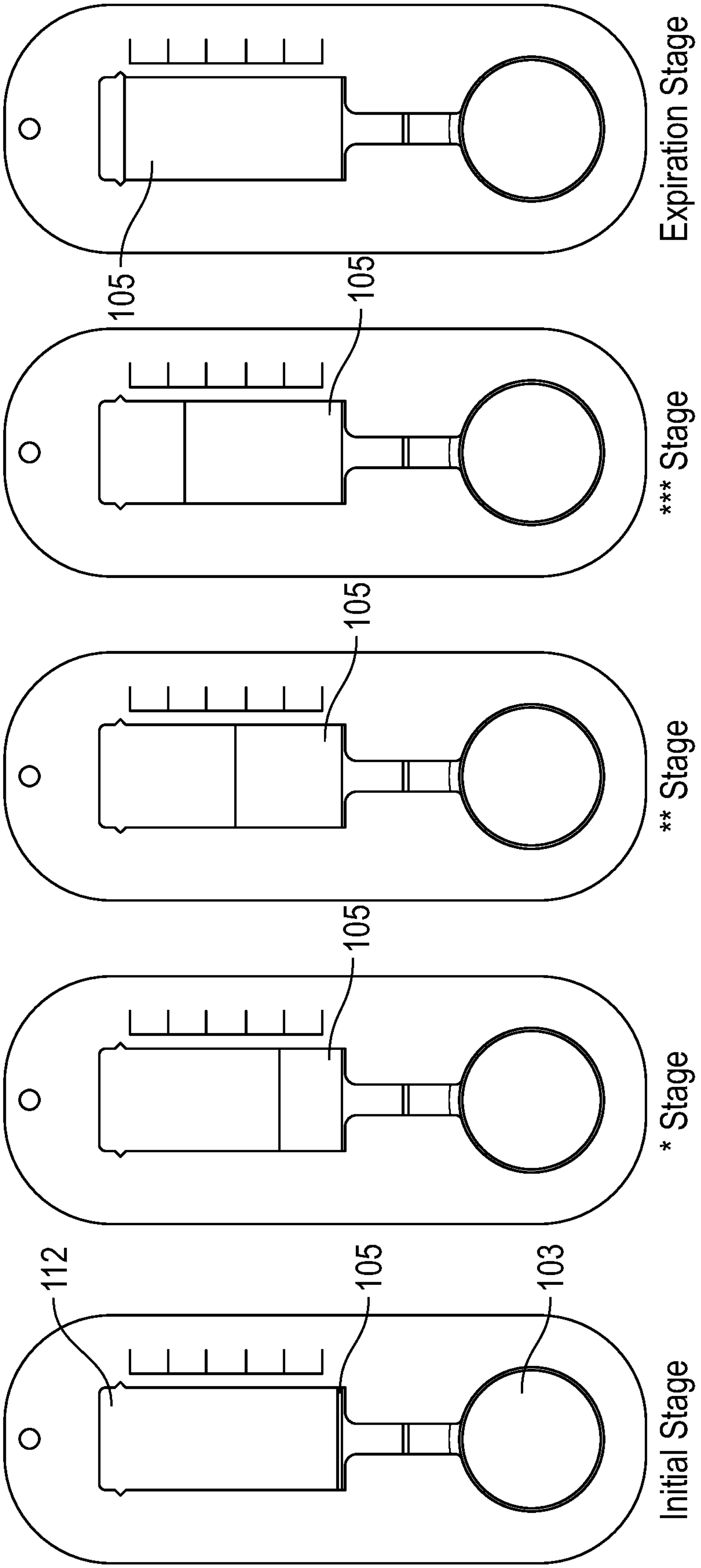
FIGS. 3A, 3B, 3C, 3D and 3E illustrate operation of a single use disposable elapsed time indicator according to aspects of the present disclosure.

FIGS. 3A-3E illustrate operation of using a single use disposable elapsed time indicator according to aspects of the present disclosure. As shown in an initial state in FIG. 3A, the aqueous medium is held in the chamber and the breakable seal is intact. The absorbable material is located nearest the first end of the slot, e.g. at the bottom of the viewing window and is pre-calibrated for elapsed time along the graded scale. The indicator can be activated by depressing the flexible chamber to force the aqueous medium from the chamber to the slot and breaking the seal. As shown in FIGS. 3B-3D, after predetermined times, the absorbable material swells and expand from the first end of the slot toward the second end of the slot, e.g., top, along the longitudinal axis. The rate of expansion of the absorbable material in the slot is a function of time. When the viewing window is completely filled, the full time has elapsed as shown in FIG. 3E. At such final position, the indicator alters the healthcare professional to take action needed at the expiration of elapsed time such as to clean or replace the particular medical device. The indicator can be calibrated to show lengths of elapsed timed from hours to days.

Figure 4:
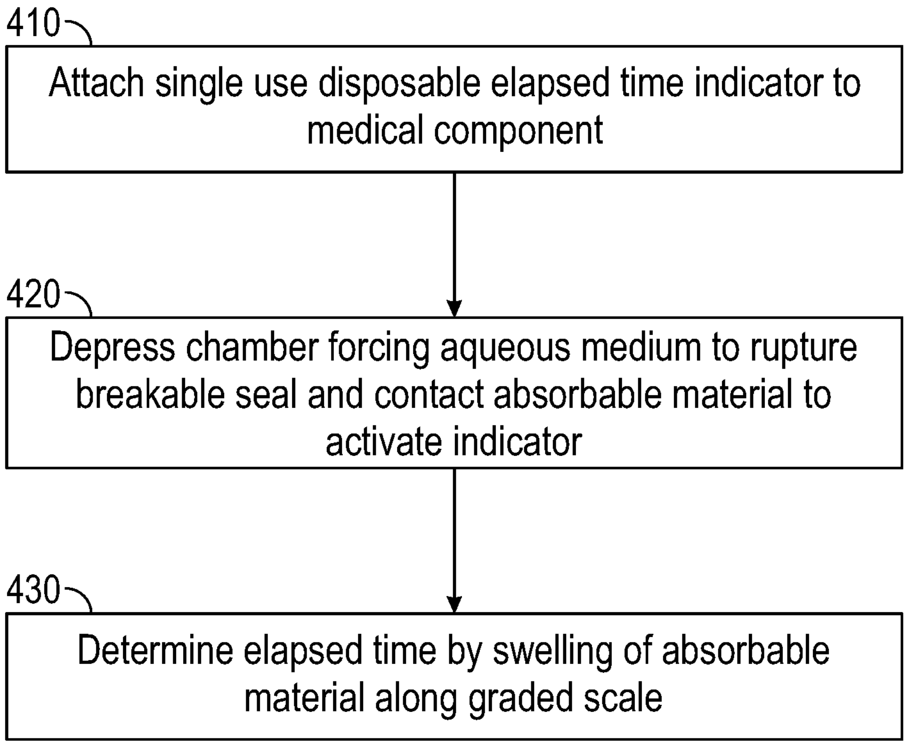
FIG. 4 illustrates a method of using a single use disposable elapsed time indicating device according to aspects of the present disclosure.

Additional aspects of the subject technology include methods of using single use disposable elapsed time indicator. Such methods can comprise an indicator that includes an absorbable material configured to swell upon exposure to an aqueous medium along a graded scale to indicate periods of elapsed time and includes activating the indicator by contacting the absorbable material with the aqueous medium. FIG. 4 illustrates an exemplary method of using a single use disposable elapsed time indicator according to aspects of the present disclosure. In step 410, an indicator (e.g., a single use disposable elapsed time indicator 100) is fastened to a medical component (e.g., needleless connector, intravenous sets, urinary bags, secondary sets, oncology sets, etc. In aspects of the disclosure, the indicator can be fastened to the medical device by an adhesive or string, etc.

In step 420, the indicator is activated, which can include depressing the flexible chamber to rupture the breakable seal and forcing the aqueous medium to contact the absorbable material. in step 430, a determination of elapsed time from activation of the indicator is determined by observing the absorbable material along the graded scale. For example, as the absorbable material expands along the longitudinal axis of the slot at a predetermined rate, the graded scale with markings along the slot indicate the elapsed time at different marks. Noting the expansion of the absorbable material along the graded scale indicates the elapsed time thus providing visual references of elapsed times associated with the expanded material at any given time after activation.

Examples

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Experiments were performed in which sodium polyacrylate balls were added to a glass tube. Water was subsequently added and the initial time of adding the water was recorded. The sodium polyacrylate balls included a red dye (Toy balls) and the water was Distilled Water. The balls expanded over time for 0 to 12 hours in one experiment and from 0-8 days in another experiment.

Linear expansion was observed with time.

The experiment was performed at normal room temperature conditions.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A single use disposable elapsed time indicator comprising:

a flexible chamber for holding an aqueous medium;

a slot having a first end and second end opposing the first end and with a viewing window and a longitudinal axis, wherein the first end of the slot is connected to the chamber via a passage having a breakable seal therein;

an absorbable material located within and at confined to the first end of the slot that swells upon exposure to the aqueous medium; and a graded scale along the longitudinal axis of the slot to indicate periods of elapsed time;

wherein the absorbable material is configured to expand from the first end of the slot toward a previously empty second end of the slot along the longitudinal axis of the slot at a predetermined rate and thereby mark elapsed time on the graded scale.

2. The indicator of claim 1, wherein the slot has a viewing window along the longitudinal axis for viewing the absorbable material.

3. The indicator of claim 1, wherein the breakable seal is configured to rupture upon pressure from the aqueous medium being forced into the slot via the passage.

4. The indicator of claim 1, wherein the slot has a volume that is less than a volume of the aqueous medium in the chamber.

5. The indicator of claim 1, wherein the passage further includes a check valve to reduce flow of the aqueous medium in the chamber.

6. The indicator of claim 1, wherein the absorbable material includes a dye having a color.

7. The indicator of claim 1, wherein the absorbable material comprises a polyacrylic acid or copolymer thereof, a polyacrylate or copolymer thereof, a polyacrylamide or copolymer thereof.

8. The indicator of claim 1, wherein the absorbable material comprises sodium polyacrylate or copolymer thereof.

9. The indicator of claim 1, wherein the aqueous medium is deionized or distilled water.

10. The indicator of claim 1, further comprising a fastener to secure the indicator to a medical device.

11. The indicator of claim 1, further comprising an adhesive on a surface of the indicator to adhere the indicator to a medical device.

12. The indicator of claim 1, wherein the graded scale denotes elapsed time periods of hours or days.

13. The indicator of claim 1, wherein the indicator is sterilized.

14. The indicator of claim 1, wherein the flexible chamber, slot, passage and breakable seal are individually or together composed of one or more of a plastic, polycarbonate, polyolefin, or acrylonitrile-butadiene-styrene copolymer.

15. The indicator of claim 1, wherein the flexible chamber, slot, passage, and breakable seal are composed of the same material and formed by injection molding.

16. The indicator of claim 1, including a transparent cover attached to the flexible chamber, slot, passage, and breakable seal.

17. A method of using single use disposable elapsed time indicator of claim 1, the method comprising:

activating the indicator by contacting the absorbable material with the aqueous medium.

18. The method of claim 17, further comprising fastening the indicator to a medical device.

19. The method of claim 18, wherein the medical device is a needleless connector, intravenous sets, or urinary bags.

20. The method of claim 17, wherein activating the device includes depressing a flexible chamber holding the aqueous medium to force the aqueous medium from the flexible chamber to a slot containing the absorbable material and rupturing a breakable seal between the flexible chamber and the slot.

* * * * *